US012403503B1

(12) United States Patent
Veglia et al.

(10) Patent No.: US 12,403,503 B1
(45) Date of Patent: Sep. 2, 2025

(54) METHOD AND CONTROL SYSTEM FOR APPLYING A POLYMER COATING MATERIAL TO A WIRE USING A COATING APPARATUS

(71) Applicant: Tau ACT GmbH, Berlin (DE)

(72) Inventors: Filippo Gionata Diego Veglia, Turin (IT); Piero Degasperi, Trento (IT); Francesco Taiariol, San Giusto Canavese (IT)

(73) Assignee: Tau ACT GmbH, Berlin (DE)

( * ) Notice: Subject to any disclaimer, the term of this patent is extended or adjusted under 35 U.S.C. 154(b) by 0 days.

(21) Appl. No.: 19/012,636

(22) Filed: Jan. 7, 2025

Related U.S. Application Data

(63) Continuation-in-part of application No. 16/591,262, filed on Oct. 2, 2019.

(51) Int. Cl.

| | |
|---|---|
| ***B05D 7/20*** | (2006.01) |
| ***B05D 1/26*** | (2006.01) |
| ***C23D 5/00*** | (2006.01) |
| ***C23D 5/02*** | (2006.01) |

(52) U.S. Cl.
CPC ............... *B05D 7/20* (2013.01); *B05D 1/265* (2013.01); *C23D 5/005* (2013.01); *C23D 5/02* (2013.01)

(58) Field of Classification Search
None
See application file for complete search history.

(56) References Cited

U.S. PATENT DOCUMENTS

| | | | | |
|---|---|---|---|---|
| 3,752,614 | A | | 8/1973 | Bremer |
| 3,979,488 | A | | 9/1976 | Greenhalgh et al. |
| 4,079,692 | A | * | 3/1978 | Cosgrove .................. B05C 3/09 118/682 |
| 4,104,481 | A | | 8/1978 | Wilkenloh et al. |
| 4,111,621 | A | | 9/1978 | Otani |
| 4,229,402 | A | | 10/1980 | Villarruel et al. |
| 4,252,755 | A | | 2/1981 | Normanton et al. |
| 4,365,790 | A | | 12/1982 | Horvath et al. |
| 4,474,638 | A | | 10/1984 | Einsle |
| 4,505,222 | A | | 3/1985 | Holt et al. |
| 4,521,173 | A | | 6/1985 | Hilker et al. |
| 4,549,421 | A | | 10/1985 | Hashmi et al. |
| 4,601,918 | A | | 7/1986 | Zaman et al. |

(Continued)

FOREIGN PATENT DOCUMENTS

| | | |
|---|---|---|
| CN | 103551282 | 2/2014 |
| CN | 203578123 | 5/2014 |

(Continued)

*Primary Examiner* — Joshua L Allen
*Assistant Examiner* — Bradford M Gates
(74) *Attorney, Agent, or Firm* — MASCHOFF BRENNAN

(57) ABSTRACT

A method of applying a polymer coating material to a wire using a coating apparatus and/or a control system. The method may include receiving coating material input to the coating apparatus at a first end of an elongate injection channel of the coating apparatus and supplying the received coating material to a coating chamber that is arranged at a second end of the injection channel. The method may include feeding wire through the coating chamber of the coating apparatus so as to apply the coating material to the wire in the coating chamber through the movement of the wire through the coating chamber.

13 Claims, 5 Drawing Sheets

(56) References Cited

U.S. PATENT DOCUMENTS

| | | | | |
|---|---|---|---|---|
| 4,649,262 | A | 3/1987 | Yoshikawa | |
| 4,708,837 | A | 11/1987 | Baxter et al. | |
| 4,723,902 | A | 2/1988 | Erickson | |
| 4,733,630 | A | 3/1988 | Sugimoto et al. | |
| 5,151,306 | A | 9/1992 | Andrews et al. | |
| 5,358,570 | A | 10/1994 | Drawbaugh | |
| 2004/0218881 | A1 | 11/2004 | Rathje et al. | |
| 2007/0139780 | A1 | 6/2007 | Suzuki et al. | |
| 2008/0038392 | A1 | 2/2008 | Druet et al. | |
| 2016/0074897 | A1* | 3/2016 | Veglia | B05C 11/021 118/56 |

FOREIGN PATENT DOCUMENTS

| | | |
|---|---|---|
| DE | 3744465 | 2/1989 |
| GB | 643990 | 10/1950 |
| GB | 1592693 | 7/1981 |
| RU | 2325957 | 6/2008 |
| SU | 845182 | 7/1981 |
| SU | 942170 | 7/1982 |
| WO | 2010/089451 | 8/2010 |
| WO | 2016/038335 | 3/2016 |

* cited by examiner

METHOD AND CONTROL SYSTEM FOR APPLYING A POLYMER COATING MATERIAL TO A WIRE USING A COATING APPARATUS

BACKGROUND

The present disclosure relates to a coating principle called hydrodynamic coating. Such a coating technique presents many differences from known, more conventional coating techniques such as, for example, extrusion coating and enameling coating.

SUMMARY

One example may include a method of applying a polymer coating material to a wire using a coating apparatus and/or a control system. The method may include receiving coating material input to the coating apparatus at a first end of an elongate injection channel of the coating apparatus and supplying the received coating material to a coating chamber that is arranged at a second end of the injection channel. The method may include feeding wire through the coating chamber of the coating apparatus so as to apply the coating material to the wire in the coating chamber through the movement of the wire through the coating chamber.

In another example, a method of applying a polymer coating material to a wire using a coating apparatus may include receiving coating material input to the coating apparatus at a first end of an elongate injection channel of the coating apparatus and supplying the received coating material to a coating chamber that is arranged at a second end of the injection channel. The coating chamber may include a cylindrical central section for receiving coating material from the injection channel and a nozzle that tapers conically from a maximum diameter at the junction with the cylindrical central section to a minimum diameter at the outlet port.

The method may include heating the coating material in the injection channel to a first temperature, pressurizing the coating material in the injection channel such that the coating material flows into the coating chamber, and heating the coating material to a second temperature, higher than the first temperature, such that the coating material has an appropriate viscosity for being applied to the wire.

The method may include feeding wire through the coating chamber of the coating apparatus so as to apply the coating material to the wire in the coating chamber through the movement of the wire through the coating chamber.

The method may include adjusting the pressure exerted on the coating material in the injection channel as a function of the quantity of the coating material contained in the coating chamber.

The method may include removing pressure from the coating material contained in the injection channel if the quantity of coating material contained in the coating chamber is higher than a predetermined threshold.

In some aspects, the wire fed through the coating chamber may be in direct contact with the coating material in the elongate cylindrical section of the coating chamber and in the nozzle of the coating chamber.

In some aspects, the wire may be centered by hydrodynamic forces generated by the nozzle.

In some aspects, the coating material may be a plastic material. In some aspects, the coating material may be a thermosetting polymer, the coating material comprising one or more of polyester, epoxy-polyester mixture, polyesterimide, polyesterimide and amideimide mixture, polyethylene, polyethylenimine, polyurethane, polyamide, epoxy, polyamide-imide, polyvinyl formal and thermosetting additives.

In some aspects, the second temperature may be lower that the temperature at which the thermosetting polymer sets.

In some aspects, coating material adhering upon the wire may be progressively thickened as the wire progresses along the coating chamber until reaching a maximum thickness in the proximity of the outlet port.

In some aspects, the progressive thickening may be due to additional resistance from hydrodynamic forces generated within the coating chamber.

In some aspects, the injection channel may be configured to replenish the coating chamber at a first rate equal to a second rate at which the coating material exits the coating chamber adhered to the wire.

In some aspects, replenishing the coating chamber does not increase the pressure within the coating chamber.

In some aspects, a combination of speed of the wire passing through the coating chamber and density, temperature and viscosity of the coating material in the coating chamber is configured to generate hydrodynamic forces within the coating chamber to adhere the coating material to the wire.

In some embodiments, a control system is configured to control the temperature of the coating material and the speed of the wire through the coating chamber such that the hydrodynamic forces are generated within the coating chamber to adhere the coating material to the wire.

In some aspects, the coating material in the coating chamber may be conveyed out of the coating chamber exclusively by the motion of the wire moving through the coating chamber.

DETAILED DESCRIPTION

Figure 1:
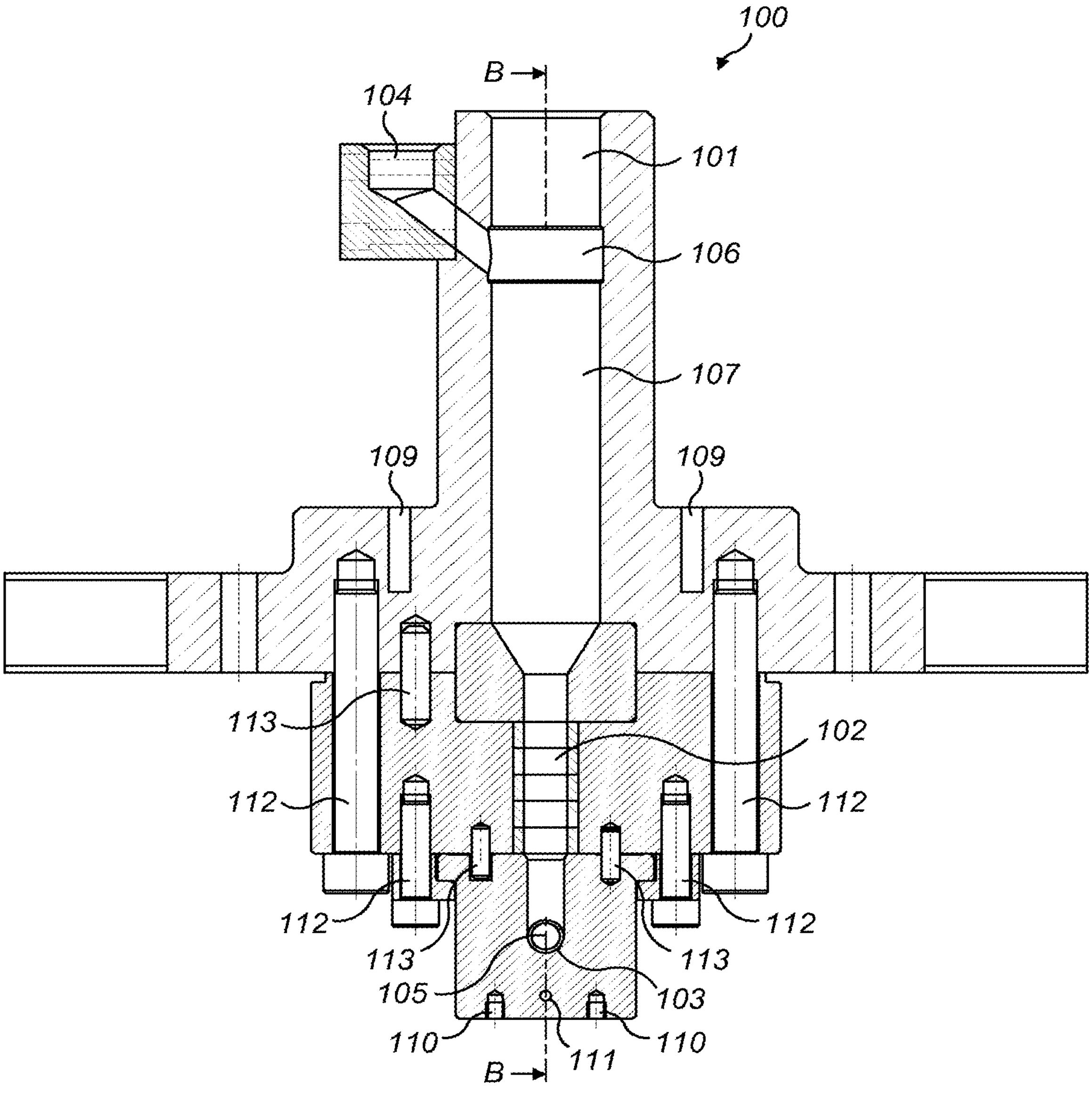
FIG. 1 shows a cross section through a wire coating apparatus according to an embodiment of the invention.

There are many applications that require metal wires with a plastic outer coating. The coating of a wire has functional purpose. For example, the plastic coating may be necessary to electrically insulate the wire. Such a coating may be required to withstand large temperatures as are experienced in applications such as electromagnets, transformers, motors and speakers. Other functional effects of a coating include increasing the corrosion resistance of the wire and a coating also provides a layer of protection between the wire and any items that the wire is attached to. This functionality may be required for applications such as wires for fencing, construction, agriculture and packaging. The coating can also be used to associate a wire with a colour. This has the advantages of clearly distinguishing the purpose of a wire, such as the different wires of a household plug or the wires connected to positive and negative battery terminals, or the properties of a wire, such as its resistance or type.

The process of applying a coating to a wire is an important part of its manufacture. The industrial manufacture of coated wire requires large quantities of coated wire to be produced quickly and efficiently.

Known industrial processes for applying a plastic, i.e. polymer, coating to a wire first dissolve the polymer in a solvent. The polymer is a polymeric material. The solvent solution is applied to the wire when the wire is being passed through an extrusion die.

The wire is then subsequently heated within an oven, at a temperature of 700° C. or higher. This causes the solvent to evaporate and leaves behind a coating of the polymer on the wire.

Although this method is the industry standard, there are a number of inherent problems with this approach. As well as the solvent being expensive, the solvents used for dissolving the polymer are carcinogenic and highly polluting. It is therefore necessary to treat the fumes produced when evaporating solvent in the heating oven before the fumes are released into the atmosphere. The process is also energy intensive and the costs involved are high. Known extrusion devices are also limited in the accuracy and uniformity of the coating they provide. Wires therefore need to be recoated a large number of times, typically 8 to 20 times, by multiple passes through the solvent based coating apparatus and oven to ensure a coating of the required thickness is achieved. It is also difficult to pause or stop the coating process once the process has begun. Manufacturers are therefore required to continuously produce coated wire in long runs. The method is also a delicate process. If the heating is performed too quickly, the evaporation of the solvents causes blisters on the wire and thereby reduces the quality of the coating.

There are no known alternative techniques for coating wires that are suitable for producing coated wire on an industrial scale.

Various solvent free techniques for coating wires have been experimented with for very low levels of production.

Electrostatically coating a wire by a powder has also been tried. However, this results in the coating being applied unevenly and can only be applied on large rectangular sections of metal.

Known techniques that have used a hot bath of thermosetting materials with low levels of solvents have not proved to be a viable alternative to the above-described solvent based techniques. The instability of the resins is a problem and it is not known how to provide a coating on a wire with good technical specifications. Attempts at using thermoplastics have also resulted in the coatings being both too thick and with a thickness that is difficult to control.

Some known techniques include an apparatus and method for pressurising a wire in order to reduce its thickness. By passing the wire through a reservoir of molten thermoplastic material the wire is also coated. However, this technique inherently reduces the diameter of the wire due to a pressure differential that is created and the technique cannot be used to only apply one or more layers of coating to a wire without also reducing the diameter of the wire. This technique also experiences the above-identified problems of the coating being too thick and the thickness being difficult to control. According, this technique is not viable for effective industrial production of wire.

Accordingly, a number of problems are experienced by known processes for coating wires and it is not known how to provide a technique for coating a wire on an industrial scale that does not use solvents as the primary agent for applying the coating to the wire.

Additional details regarding different coating techniques will be described as follows.

Wire Extrusion Coating

In wire extrusion coating, a tubular layer of coating material (i.e., a cylindrical structure of coating material) is formed and simultaneously fitted around the surface of a moving wire. In order to form such a cylindrical structure of coating material, a predetermined quantity of highly pressurized molten coating material is forced through an extrusion die (i.e., an opening configured to shape the coating material according to a predetermined geometry) and immediately fitted on the surface of a wire that moves concentrically with respect to the extrusion die. Typically, the wire is pulled at a certain speed and guided through the extrusion die by means of a positioning die which is usually arranged concentrically with respect to the opening of the extrusion die; as a result, the tubular layer of coating material gets in contact with the surface of the moving wire as soon as it passes through the extrusion die.

Extrusion coating inherently presents several overwhelming problems. First, as the coating layer is simply formed around the wire, the resulting coated wires are usually characterized by poor mechanical properties such as, for example, a very low adhesion between the coating layer and the wire. In this regard, it is known in the art to improve adhesion by applying an intermediate layer comprising an adhesive agent between the wire and the sleeve of coating material; although feasible, such a solution is often not desirable as it increases the complexity and the running cost of the extrusion apparatus.

Secondly, in order to allow the coating material to be forced out of the extrusion die, it is essential to apply a significant amount of pressure on the material and, not less important, to guarantee continuity of such extremely high pressure during the whole coating procedure. In particular, in order to properly fit on the surface of the moving wire, the coating material (contained, for example, in a dedicated reservoir) needs to be accelerated at the same speed of the wire; any minor variation of the pressure exerted on the coating material would inevitably shift the speed of the coating material exiting the extrusion die thus causing a variety of defects on the final product (inconsistent thickness of the coating layer such as voids or ripples). In particular, if the speed of the coating material exiting the extrusion die is higher than the speed of the wire moving through it, the tubular layer of coating material at the exit of the extrusion die tends to accumulate and to form ripples on the surface of the wire; on the contrary, if the speed of the coating material exiting the extrusion die is lower than the speed of the wire moving through it, the tubular layer of coating material tends to be stretched and to form voids.

Seen from a different angle, in order to avoid any superficial defect, it is essential to minimize the dynamic friction between the surface of the moving wire and the tubular layer of coating material as it is extruded and laid onto the surface of the wire; as it can be easily deduced, when the speed of the moving wire is equal to the speed of the coating material, the dynamic friction between the two tends to be zero or negligible.

Wire Enameling Coating

In enameling coating, a coating material is typically applied on a wire by directly dipping the wire into a certain quantity of liquid coating enamel (e.g., a polymeric enamel, also referred to as varnish in the rest of the present description) contained, for example, into a dedicated enameling vessel. More specifically, as the wire moves through the enameling vessel, a thin layer of liquid coating material adheres on its surface and exits the vessel as the wire moves out of the vessel.

Coating enamels are typically prepared by diluting small quantities of solid-state coating material into one or more solvents; as a consequence, after applying the enamel on the wire, it is usually necessary to remove the excess of solvents from the applied coating layer by heating the wire through, for example, a dedicated furnace. Further, as the enamel or varnish is maintained at a very low density in the enameling vessel, the adhesion achieved between the coating material and the surface of the wire typically relies exclusively on microscopic bonding. As a result, the amount of coating material dragged out of the vessel by the movement of the wire is scarce and the maximum coating thickness achievable at each step of the enameling coating process is usually very low. More importantly, as the viscosity and the density of the coating material is maintained at very low values, it is often very challenging to uniformly retain the layer of coating material laid around the wire during the enameling process; for example, in order to minimize the gravity dripping of the liquid coating material applied on the surface of the wire, the enameling coating process along with the drying procedures are usually held in a vertical fashion thus increasing the complexity and the space requirements of the manufacturing plant.

For at least the reasons explained above, the surface of the coating layer applied on the wire by means of enameling coating may comprise unwanted irregularities (e.g., drops, air bubbles, etc.); such imperfections are usually adjusted, at some point of the enameling process, by forcing the enameled wire into a shaping die which is configured to smooth the surface of the enameled wire by mechanically removing any excess of coating material. Further, in order to achieve a predetermined thickness of the coating layer applied around the wire, it is often necessary to deposit multiple layers of coating material on the wire by repeating the whole enameling process multiple times. Another problem related to enameling coating regards the fact that the thickness, the shape, the uniformity, the concentricity, and, in general, the geometry of the coating layer applied around the wire are hardly controllable with a given degree of precision.

Advantages of the Disclosed Embodiments

The solvent-free coating method and apparatus described herein allows to overcome most of the above-described problems affecting extrusion and enameling coating; specifically, besides allowing to completely avoid the use of any solvent agent, the solvent-free coating apparatus described herein allows to achieve a coating layer characterized by optimal mechanical and structural properties (e.g., high adhesion, optimal uniformity of the coating layer, customizable geometry and thickness, etc.).

The coating principle (i.e., hydrodynamic coating) on which the apparatus and the method according to the present invention rely on, leverages the resistive forces generated by the coating material against the motion of the wire passing through the coating chamber. Similarly to enameling coating (and opposite to any extrusion technique), as the wire enters the coating chamber, a certain quantity of coating material adheres upon the surface of the wire with the result of creating a thin layer of coating material around it. According to an aspect of the present invention, such thin layer of coating material adhering upon the surface of the wire is progressively thickened as the wire progresses along the coating chamber until reaching a maximum thickness in the proximity of the outlet port; such additional thickening effect is due to the additional resistance offered by the field of hydrodynamic forces generated within the coating chamber.

In operation, the coating material, which is pre-heated and melted according to a predetermined heating progression, is conveyed to the coating chamber through a supplying arrangement (or supplying means) comprising, for example, an injection channel and a pressurizer; such supplying arrangement is configured to load the coating chamber with a predetermined quantity of melted coating material and to keep the coating chamber filled with coating material (i.e., up to a predetermined level) during the coating process. More specifically, the supplying arrangement is configured to replenish the coating chamber at a rate (also referred to as injection rate or input rate) equal to the rate (also referred to as coating rate or output rate) at which the coating material exits the coating chamber. Contrarily to any other known coating technique where, as explained above, the friction exerted by the coating material on the moving wire is inevitably or purposefully kept as low as possible, the architecture of the coating apparatus is intentionally designed to increase, up to a predetermined level, the resistance provided by the coating material to the motion of the wire passing through the coating chamber; as a result of the configuration of the coating chamber as described herein (e.g., the length of the cylindrical section, the shape and the angle of the nozzle, etc.), such resistance is intensified by the effect of the hydrodynamic forces generated in the coating chamber.

According to the described configurations, such hydrodynamic forces, that are primarily responsible for building up the coating layer upon the surface of the wire, require a predetermined set of conditions to subsist. More specifically, in order to create a coating layer with optimal mechanical properties in terms of, for example, superficial uniformity and adhesion, the combination of a set of operating parameters such as the speed of the wire passing through the coating chamber as well as the density, the temperature and the viscosity of the coating material contained in the coating chamber must be as such as to promote the generation of such hydrodynamic forces within the coating chamber. Further, and equally important, as opposed to extrusion coating, it is essential that the coating material contained in the coating chamber is not accelerated and pushed out of the coating chamber due to the effect of the external pressure (i.e., not directly generated by the motion of the moving wire) applied on the coating material; instead, the coating material must be accelerated and conveyed out of the coating chamber exclusively by the motion of the wire moving through the coating chamber.

As a result, in order to maximize the beneficial effect of such coating technique, it is of paramount importance to eliminate or at least minimize any external pressure component (i.e., not directly generated by the motion of the moving wire); for example, the pressure generated by the injection of coating material into the coating chamber must be as low as possible so as not to alter the effects (and the dynamics) of the hydrodynamic forces. To this end, the pressure exerted by the press on the coating material contained in the injection channel is only intended to push the coating material down the injection channel with the only goal of replenishing the coating material in the coating chamber; during such replenishing operation, it is essential to avoid creating additional pressure in the coating chamber (i.e., the pressure in the coating chamber must be generated only by the motion of the wire and the resulting hydrodynamic forces).

Any pressure component generated in the coating chamber by the effect of the supplying means (i.e., press and injection channel) may have a detrimental effect on the intensity of the hydrodynamic forces generated in the coating chamber; in fact, when the injection pressure becomes too high, instead of being accelerated by the motion of the wire, the coating material contained in the coating chamber is accelerated and pushed out of the outlet of the coating chamber by the coating material being injected through the injection channel. Under such conditions, due to a reduction in the dynamic friction between the wire and the coating material, the intensity and the dynamics of the hydrodynamic forces is inevitably compromised with the result of causing the problems listed above in relation to extrusion coating (e.g., poor adhesion and superficial discontinuity).

Accordingly, the disclosed embodiments include a method, apparatus and system for coating a wire. Embodiments provide a wire coating technique that is suitable for the industrial production of coated wire and overcomes at least some of the problems experienced by known industrial production techniques.

Embodiments may be used to apply a coating to any type of wire. The wire may comprise any type of metal for use as wire. Preferably, the wire is made of copper, aluminium, or steel. The type of wire will depend on the application of the wire. Copper and aluminium wire is typically used for electrical applications such as a winding of an electromagnet. Steel wire is typically used for applications such as construction and packing. To aid adherence of the coating material to the wire, the wire is preferably thoroughly cleaned of all impurities prior to a coating process. In particular, for copper wire, the copper has preferably been annealed prior to the coating process.

The coating is a plastic material. Preferably, the applied coating is a thermosetting polymer material. The specific type of thermosetting material that is used may depend on the type of metal that the wire is made of and/or the desired properties of the coating. Prior to being fed into a wire coating apparatus 100, the coating may be a powder, liquid, solid pellets, chips or cartridges or have other forms that are generally known for paints and enamels.

Embodiments provide a coating apparatus 100 that receives a wire, that may be uncoated or already have one or more layers of coating applied. The coating apparatus 100 applies an outer coating of a thermosetting material to the received wire 105. The temperatures and pressures within the device are controlled to provide a relatively small coating chamber comprising coating material at an appropriate viscosity for applying to a wire 105 but below the thermosetting temperature of the coating material. The coating is applied to the wire by passing the wire through the coating chamber. The wire is then fed to an oven 401 in which it is heated to a temperature at which the thermosetting coating material sets. The wire is then passed through a cooling chamber 402. If it is necessary to increase the thickness of the coating of the wire 105, the wire 105 is re-fed through the coating apparatus 100 and other parts of the system as many times as required. The number of passes through the system required is typically one to four.

Advantageously, embodiments provide an industrial process for applying a coating to a wire 105 that is easier, safer and cheaper than known techniques that require the use of solvents as the primary agent for applying a plastic coating to a wire. By accurately controlling the temperatures throughout the coating apparatus 100, molten thermosetting material is directly applied to a wire. Embodiments are also more efficient than known techniques because the required temperatures are lower. The oven 401 for heating the wire 105 can also be smaller as it is not required to extract and process the fumes of evaporating solvents. The process according to embodiments can also be easily and accurately controlled. The coated wires manufactured according to embodiments have equivalent functionality to coated wires generated according to known techniques.

Figure 2:
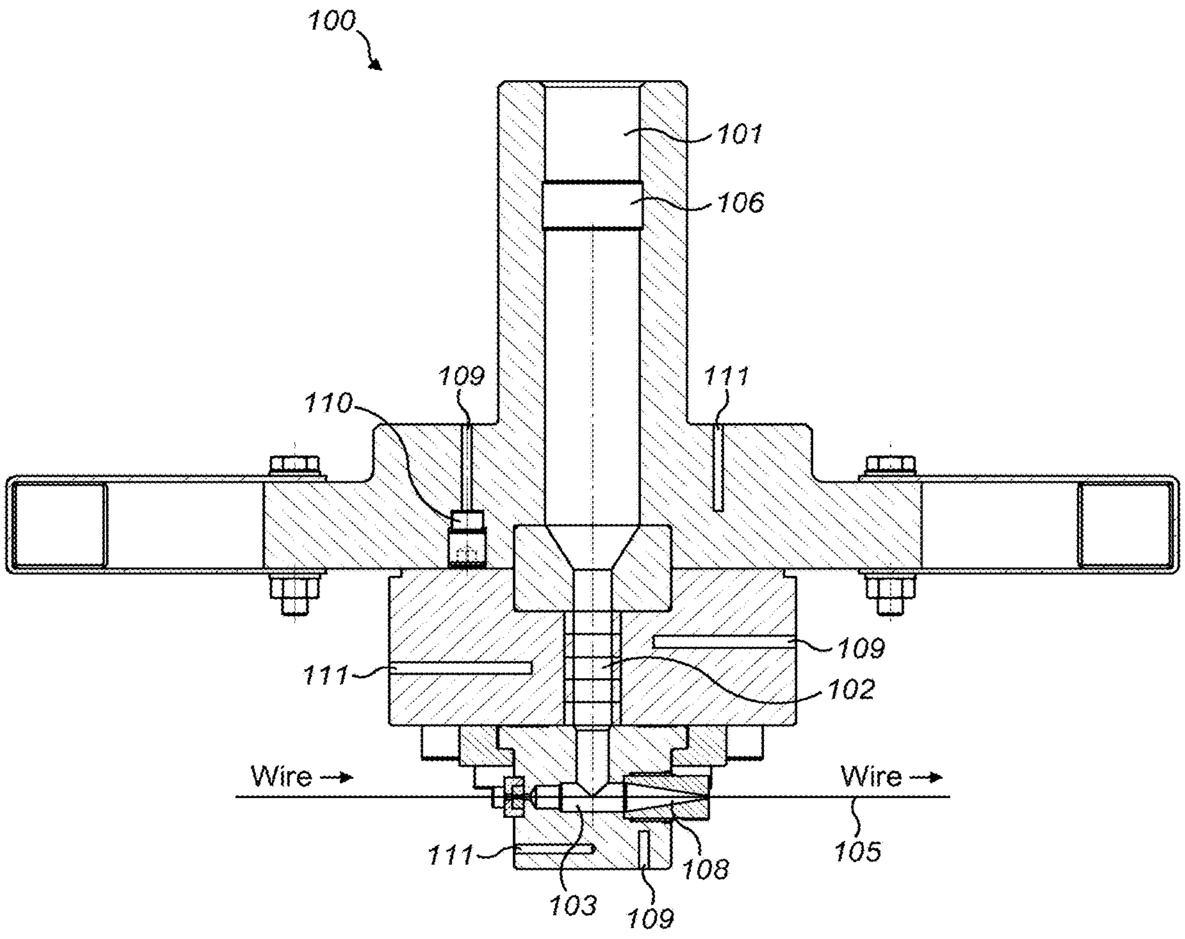
FIG. 2 shows a cross section through a wire coating apparatus according to an embodiment of the invention.

An embodiment of a coating apparatus 100 for applying the coating to a wire 105 is shown in FIGS. 1 and 2.

FIGS. 1 and 2 show cross-sections through the coating apparatus 100. FIG. 1 is an end on view along the axis of wire 105 that is passed through the coating apparatus 100. FIG. 2 is a side on view of the apparatus showing a perpendicular cross-section to that in FIG. 1.

The coating apparatus 100 comprises an injection channel 107 for receiving coating material and feeding the coating material to a chamber where the coating material is applied to a wire 105. The injection channel 107 comprises an inlet portion 104 through which coating material is fed into the apparatus. The injection channel 107 comprises a reservoir of coating material. The top of the injection channel 107 is an upper cylindrical section 101. The bottom of the upper cylindrical section 101 tapers conically and at its narrower end continues as the lower cylindrical section 102, that has a smaller diameter than the upper cylindrical section 101. The bottom end of the lower cylindrical section 102 connects into a coating chamber 103. The interior of the injection channel 107 and the interior of the coating chamber 103 are in fluid communication with each other such that the injection channel 107 is a feed for supplying coating material to the coating chamber 103.

Provided within the upper cylindrical section 101 of the injection channel 107 is a piston 106. The piston 106 can move along the upper cylindrical section 101 of the injection channel 107. The movement of the piston 106 along the injection channel 107 towards the coating chamber 103 has the effect of pressurising coating material in the injection channel 107. Present, although not shown in FIGS. 1 and 2, is a drive mechanism for moving the piston 106 along the upper cylindrical section 101. The drive mechanism may be hydraulic and is preferably automatically controlled.

The central section of the coating chamber 103 is a cylinder, the axis of which is located perpendicularly to the axis of the injection channel 107. Wire 105 for coating is passed through the coating chamber 103, along the axis of the cylindrical central section of the coating chamber 103. As shown in FIG. 2, the end of the coating chamber 103 that receives the wire feed has a seal, preferably made of a polymeric material, at the inlet port where the wire 105 enters the coating chamber 103. Preferably the seal is fixed in place by a fixing element located on the external surface of the coating apparatus 100. During a coating operation, the coating apparatus 100 is therefore hermetically sealed and the contents of the coating chamber 103 are prevented from escaping through the inlet port. The other end of the coating chamber 103 comprises a coating nozzle 108. The wire 105 feed exits the coating chamber 103 through the coating nozzle 108.

The coating nozzle 108 is formed with its shape in the coating chamber 103 being a cone that narrows towards the outlet port of the wire 105 from the coating chamber 103. The coating nozzle 108 may be made integral with the rest of the coating chamber 103. Preferably, the coating nozzle 108 is a separable unit that is connectable to the rest of the coating chamber 103, for example by a thread or screw, however any method of attachment that can be conceived could be used. This allows coating nozzles with different diameters of outlet port to be used, as is appropriate for generating different diameters of coated wire 105. Coating nozzle 108 in FIG. 2 is shown with preferable proportions and to a preferable scale. In one embodiment a nozzle outlet port diameter of 0.980 mm±0.005 mm is used with an opening angle of 10° to 20° of the cone. However alternative nozzle geometries can be envisaged. The conical shape to the nozzle has the advantageous effect of generating hydrodynamic forces that aid the application of coating material within the coating chamber 103 to wire 105 that is being passed through the nozzle. The hydrodynamic forces automatically centre the wire 105 in the middle of the nozzle and this improves the uniformity of the applied coating.

The nozzle geometry also supports the use of high wire feed speeds and the stress on the wire 105 is low. The different opening angle geometries of the nozzle enable different wire speeds to be achieved as the opening angle defines the applied shear forces. There is no direct physical contact between the nozzle and a wire 105 that is being coated and this improves the durability of the nozzle and prevents damage to the wire 105. The thickness of the applied coating depends on the diameter of the outlet port from the nozzle. For each operation of a coating process, a nozzle design can be chosen that results in a desired coating thickness. The nozzle can be replaced with another nozzle with a different opening angle and/or outlet port diameter between different passes through the apparatus after passing through the coating oven. Alternatively the wire could be passed through a series of nozzles during one coating pass. The different nozzles may be of the same dimensions or may have differing dimensions. Advantageously, through the choice of the nozzle, a coating thickness as small as 15 microns is possible as well as thicker coatings.

The coating apparatus 100 also comprises at least one pressure sensor so that the pressure within the coating apparatus 100 during a coating operation can be determined.

The coating apparatus provides a fluid path that the thermosetting coating material passes through. During this process the temperature of the coating material is progressively raised, such that it is at the desired viscosity at the end of the fluid path for applying the coating material to a wire. In one specific embodiment the fluid path may be formed of the injection channel 107 and the coating chamber 103. The temperature of the coating material is progressively raised along the fluid path by a number of controllable heating elements.

Figure 3:
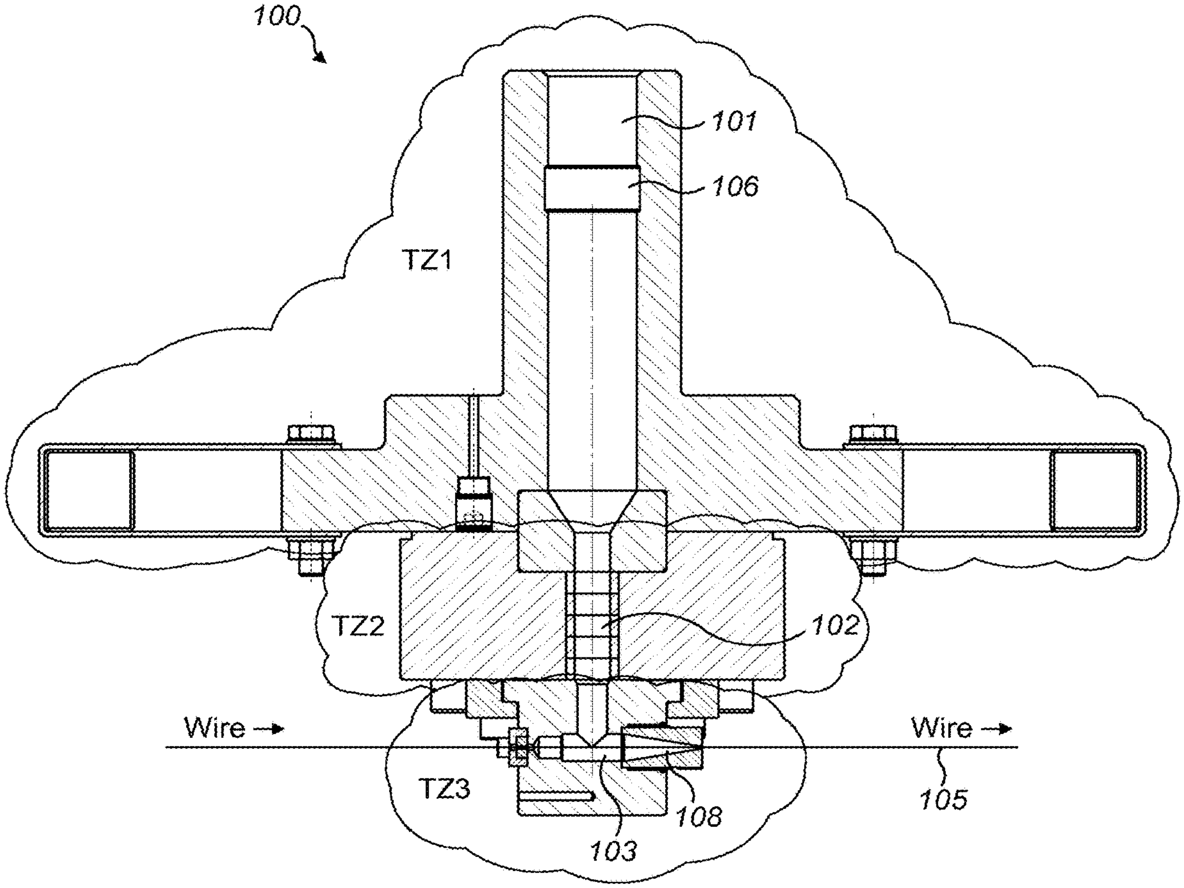
FIG. 3 shows a cross section through a wire coating apparatus according to an embodiment of the invention.

FIG. 3 shows three temperature zones within the coating apparatus 100. Temperature Zone 1, TZ1, comprises the upper cylindrical section 101 of the injection channel 107. Temperature Zone 2, TZ2, comprises the lower cylindrical section 102 of the injection channel 107. Temperature Zone 3, TZ3, comprises the coating chamber 103. Each temperature zone has a different temperature profile. It should be noted that the shown locations of the temperature zones are approximate. The temperature zones indicate different regions within the apparatus in which at least some, and preferably most, of the coating material in the region is heated to within a temperature range associated with the temperature zone. The desired temperature ranges within each temperature zone will depend on the specific coating material being used.

The coating apparatus 100 also comprises a plurality of heating elements 109. The effect of the heaters is to heat different parts of the apparatus to different temperatures. The heating elements 109 can be inserted into holes within the metal casing of the apparatus, with a means of fixing 110. The heating elements are preferably evenly distributed throughout the coating apparatus 100 to ensure heat transfer from the metal to the coating material is uniform. Typically these heating elements 109 can be co-axial or radial to the chamber geometry. In one embodiment the heating elements in TZ1 can be co-axial with the injection channel 107, radial with the lower cylindrical section 102 in TZ2, and radial with the coating chamber 103 in TZ3. Preferably, 4 or 6 heating elements are arranged at regular intervals to ensure uniform heating; however any number of heating elements with any arrangement could be used. The heating elements are preferably electrical resistances. However, any type of heating element as known in the art may be used. The heating elements typically have powers of 70 to 200 W. The heating elements are typically small cylinders, 6.5 mm in diameter and about 40-60 mm long, however any other geometry that can be envisaged could be used.

The coating apparatus 100 also comprises a plurality of temperature sensors 111 to allow accurate control of the temperatures throughout the coating apparatus 100. The temperature sensors can be thermometers, temperature probes or any other means of measuring temperatures. This control can be by varying the power output of the heating elements 109 to regulate the temperature. As shown in FIGS. 1 and 2 each temperature zone comprises one temperature sensor 111, however in certain embodiments more than one temperature sensor in each temperature zone could be included. Temperature sensors 111 are inserted within a hole in the metal casing with the temperature sensitive part of the temperature sensor as close to the coating material as possible. In certain embodiments the temperature sensor can be located to measure in the centre of the thermal zone. The temperature of the metal casing close to the coating material gives a good estimate of the temperature of the coating material as the metal casing is in contact with the coating material, transferring the heat from the heating elements to the coating material. The accuracy of the temperature measurement will improve as the temperatures in the coating apparatus reach a steady state after a coating operation being started, so that the measured temperatures are an accurate measure of the temperature of the coating material.

The metal casing ensures that uniform heating of the coating material is maintained within each thermal zone. This is ensured by the mass of the metal casing being a lot larger than the mass of the coating material, and the slow flow rate of the coating material within each temperature zone, thus the temperature gradients between the metal casing and coating material should be small during steady state operation. Temperature gradients will be particularly small in TZ3, where the coating chamber 103 is preferably made of a high conductivity alloy such as copper-beryllium to minimise the temperature differences as the polymer nears the coating nozzle 108. The external surface of the coating chamber 103 is preferably covered with insulating material to help maintain the internal temperature of the coating chamber 103 and to improve the safety of the coating apparatus 100.

Although not shown in FIGS. 1 to 3, each of the temperature zones preferably has a layer of thermal insulation provided between the metal parts used to construct the different temperatures zones within the coating apparatus 100. This reduces the heat transmission through the body parts of the coating apparatus 100 and therefore helps to maintain the different temperatures of the temperature zones within the coating apparatus 100.

At the point of application of the coating material to a wire 105, which occurs in TZ3, the coating material needs to be at a viscosity appropriate for application to the wire 105, the viscosity being dependent of the temperature and pressure of the coating material. The purpose of the different temperature zones is to provide a sufficient amount of coating material at the desired viscosity, i.e. temperature and pressure, for applying to a wire 105 in the coating chamber 103, the coating material having been progressively heated by the different zones to the required temperature in TZ3. The coating material will be at its lowest viscosity state at the point of application of coating to the wire.

Attachment between the different components of the apparatus is achieved by bolts 112. The bolts 112 used are designed to withstand the pressure and force generated within the injection channel 107 by the piston when in operation. Dowel pins 113 are functionally used to keep perfect alignment of the injection channel 107 with the rest of the apparatus.

The coating material is fed into the coating apparatus 100 through the inlet portion 104. The coating material is received in the upper cylindrical section 101 of the injection chamber in TZ1. The coating material is then heated within TZ1 to a temperature at which the coating material is in a rubbery state and able to flow when pressurised by the piston 106.

The piston 106 is then actuated so that it pressurises the coating material within the upper cylindrical section 101. The coating material is pressurised by the piston 106 to the pressure at which it is desired to apply the coating material to the wire 105. Once this pressure is reached, the piston 106 does not pressurise the coating material further but is controlled to maintain the pressure within the injection channel 107, and coating chamber 103, constantly at the desired pressure for applying the coating material to the wire 105.

The effect of heating and pressurising the coating material in TZ1 is to ensure that the coating material is in a state in which it flows from the upper cylindrical section 101 through the tapered conical section and into the lower cylindrical section 102 in TZ2. The coating material is preferably heated to be in a rubbery state rather than a liquid state. The diameter and length of the lower cylindrical section 102 are less than those of the upper cylindrical section 101 and the volume of coating material in the lower cylindrical section 102 is therefore a lot less than that in the upper cylindrical section 101. In TZ2, the coating material is heated to a higher temperature than it was in TZ1 and its viscosity therefore decreases.

The coating material flows from the lower cylindrical section 102 into the coating chamber 103 in TZ3. The amount of coating material in the coating chamber 103 is very small due to the low volume of the coating chamber 103. In TZ3, the coating material is heated to a higher temperature. Preferably, the coating material remains in a rubbery state in TZ2 and, in response to being heated further in TZ3, the viscosity of the coating material in TZ3 decreases to a desired level for applying the coating material to a wire 105. The coating material may be a liquid in TZ3. Preferably, the maximum temperature in TZ3 is sufficient to liquefy thermosetting coating materials but controlled to be below the temperature at which curing of the thermosetting material occurs.

During a coating operation, wire 105 is fed through the coating chamber 103 with coating material therein being at an appropriate viscosity for applying to the wire 105. The conical shape of the coating nozzle 108 results in hydrodynamic forces being generated within the coating nozzle 108 when the wire 105 is fed through the coating nozzle 108. Advantageously, this results in very effective application of the coating material to the wire 105.

The wire 105 output from the coating apparatus 100 therefore has a thin layer of coating material applied to it by the coating apparatus 100. Advantageously, the coating operation can be performed with a high wire feed speed and the application of the layer to the wire 105 is substantially uniform.

As the coating material flows along the injection tube and into the coating chamber 103 in response to the pressure from the piston 106 and, if the coating apparatus 100 is located vertically, due to the force of gravity, the piston 106 moves along the upper cylindrical section 101 towards the coating chamber 103 to maintain the desired pressure.

The effect of heating the coating material in a plurality of temperature zones, with the amount of coating material in TZ3 being less than that in TZ2, and the amount of coating material in TZ2 being less than that in TZ1, is that only a very small amount of coating material for applying to a wire 105 is at the correct temperature and pressure for this. Advantageously, the coating operations are easy to pause or stop since most of the coating material is not at the temperature at which it is least viscous. It is easy to remove coating material from the coating apparatus 100 if it is in a rubbery or solid state and so stopping a coating process does not result in the coating material clogging up the coating apparatus 100. Thermosetting coating materials are also not heated to the temperature that causes them to set as so they do not irreversibly harden within the apparatus.

The temperature zones TZ1 and TZ2 advantageously ensure that the heating elements for TZ3 are easily able to heat the coating material that flows into the coating chamber 103 to replace coating material that has been applied to a wire 105 to the required temperature in TZ3 because the replacement coating material has already been heated.

The different thermal zones within the coating chamber 103 are controlled to be at stable temperatures. Advantageously, the thermal zones slowly bring the coating material to a temperature where its viscosity is the lowest but below the temperature at which polymerization begins. The gradual increase in the temperature of the coating material occurs as the coating material progresses through the apparatus.

Figure 4:
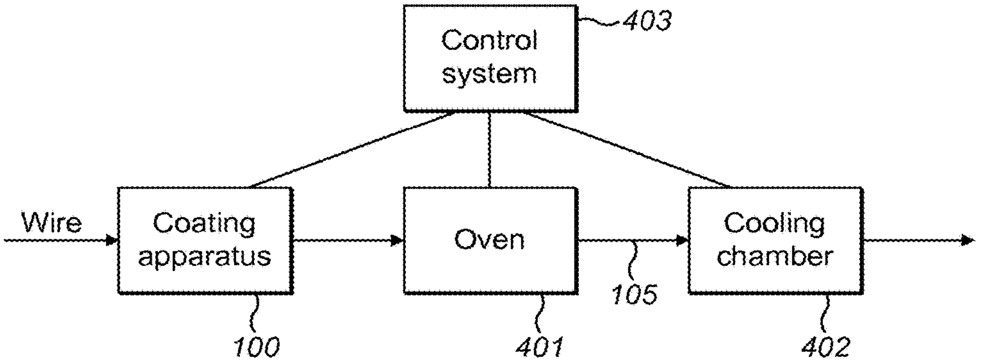
FIG. 4 shows a coating system for use with thermosetting coating materials according to an embodiment of the invention.

FIG. 4 shows a coating system for use with thermosetting coating materials according to embodiments. The system comprises the coating apparatus 100 according to the above-described embodiments, an oven 401, a cooling chamber 402 and a control system 403.

Figure 5:
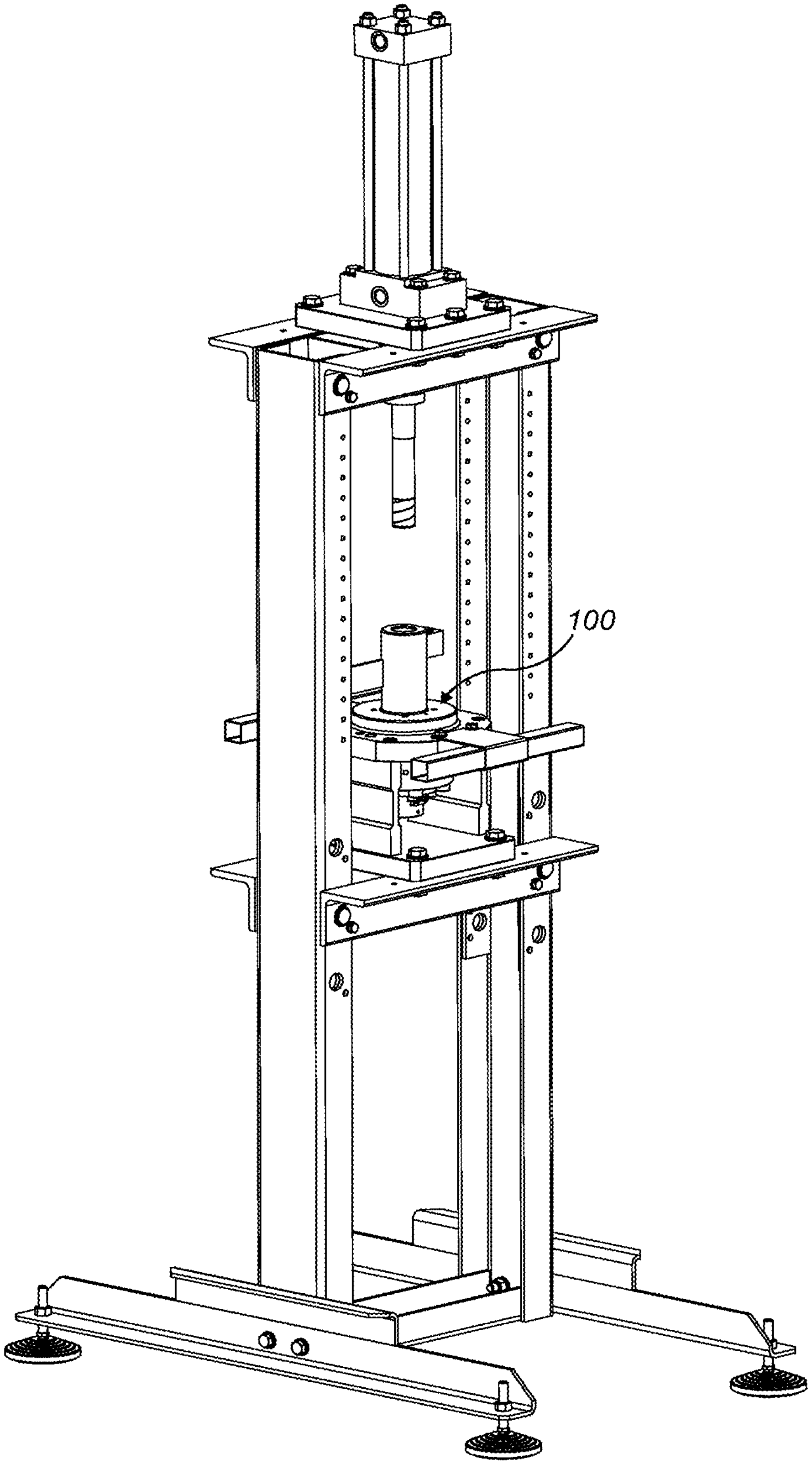
FIG. 5 shows how the coating apparatus may be implemented in the coating system.

FIG. 5 shows how the coating apparatus 100 may be implemented in the coating system.

During a wire coating operation, wire 105 is fed into the coating apparatus 100 that applies a layer of coating material, that is a thermosetting material, to the wire 105. In the presently described embodiment, the wire 105 input to the coating apparatus 100 is uncoated wire 105. The wire 105 output from the coating apparatus 100 is fed into the oven 401. The oven 401, which may be an annealing oven 401 or curing oven 401, heats the coating material to a temperature at which the thermosetting material sets thereby hardening the applied layer of coating material on the wire 105. The setting is caused by polymerisation of the thermosetting material as cross links are formed.

The wire 105 is then fed into a cooling chamber 402 where it is cooled to a temperature at which it either be wound, or fed back into the coating apparatus 100.

If the coating on the wire 105 has the desired thickness, the coated wire 105 is ready for use. It would typically be wound on a large drum at this stage.

If a thicker coating on the wire 105 is desired then the coated wire 105 is fed back into the coating apparatus 100 and the process of applying a layer of thermosetting polymer to the wire 105, heating the wire 105 to a temperature that causes the newly applied thermosetting polymer to set and then cooling the wire 105 is repeated as many times as required. Preferably, a thin coating, that may be 15 microns thick, is applied two to four times as the multiple applications improve the uniformity of the coating thickness. Additional passes through the apparatus strengthens the coating and improves its mechanical characteristics.

One specific embodiment of this invention is in the coating of copper wire for use as magnet wire. Copper wire of a uniform thickness of 1 mm can be coated using a coating material comprised of a mix of polyvinylformal, bisphenol epoxy, curing agents. Temperature ranges of the thermal zones preferable for this coating process are TZ1 40 to 80° C., TZ2 80 to 120° C., and TZ3 120 to 220° C. For example, the control system may control heating elements to 60° C. in TZ1, 100° C. in TZ2 and 170° C. in TZ3. Wire coating speeds of 25 m/min are achievable with this particular polymer. Preferably, at least two passes through the apparatus are made and three or four passes are preferable to better achieve a uniform wire coating thickness. Coating thickness of between 15 to 45 microns can be achieved.

In a further embodiment of this invention coating is applied to steel wire. Steel wire with a thickness of 0.96 mm is coated with a polyester polymer (mix 70% polyester, 30% epoxy). Temperature ranges of the thermal zones preferable for this coating process are TZ1 40 to 60° C., TZ2 60 to 77.5° C., and TZ3 77.5 to 95° C. For example, the control system may control heating elements to 50° C. in TZ1, 70° C. in TZ2 and 85° C. in TZ3. In this embodiment coating speeds of 75 m/min can be reached, with a coating of 15 to 45 microns achieved in a single pass through the apparatus.

The control system 403 automatically controls the entire wire coating process. The control system 403 receives the user input of the properties of the wire 105 to be coated and the type, and properties (in particular thickness), of the coating material to be applied to the wire 105. The control system 403 then determines the required temperatures of the temperature zones within the coating apparatus 100, the required pressure within the coating apparatus 100, the required temperature of the oven 401 and the required wire feed speed in dependence of the properties of the wire 105 and/or coating material. The control system 403 then controls the coating apparatus 100 so that the temperature zones within it are heated to the required temperatures, controls the drive mechanism of the piston 106 to apply the desired pressure within the coating apparatus 100, controls the heaters of the oven 401 so that the oven 401 is at the required temperature and then controls a wire feeder to feed the wire 105 through the coating system at the required speed. The control system 403 receives feedback of the actual wire feed speed, temperatures and pressures throughout the coating system and uses the feedback information to accurately control all of these parameters throughout the coating system.

Wire coating speeds range between 30 to 100 m/min, with typical working speeds of 50, 75 and 100 m/min. Wire speeds depend upon the nature of the wire being coated, for instance diameters, materials, and the coating material, for instance its viscosity. In some implementations it is preferable to operate the coating system with a lower wire feed speed than the maximum achievable as this ensures that the wire is in the curing oven for longer. The oven can therefore be operated at a lower temperature than that required for higher wire feed speeds and this decreases the energy requirements.

A wide range of coating materials and wire 105 types are compatible with the coating system. The control system 403 is able to easily adapt the temperatures, pressures and wire feed speeds used to appropriate levels given the specific materials being used and the desired properties of the manufactured coated wire 105.

Although not shown in FIG. 4, the coating system would also comprise devices for feeding wire 105 through the system, winding wire 105 that has been coated etc. These devices and their implementation would be known to a person skilled in the art.

The coating material could be any of a large number of thermosetting polymers. The thermosetting polymers may comprise any of polyester, epoxy-polyester mixture, polyethylene, polyethylenimine, polyurethane, polyamide, polyamide-imide, a thermosetting polyvinyl formal compound, epoxy, polyesterimide, and other materials. The coating material may be a mixture of any of these polymers as well as with other substances, in particular thermosetting additives. For example, a mixture comprising 60% polyvinyl formal and 40% thermosetting additive, or polyesterimide and amideimide mixture, may be used.

Suitable such polymer materials are known and available from various suppliers, such as ELANTAS.

Coating materials that are already known for use in solvent based wire coating techniques can be used in embodiments.

The form of the coating material could be any of a powder, liquid, solid pellets, chips or cartridges or other forms that are generally known for paints and enamels.

The desired thermal profiles of the different temperature zones depend upon the polymer material being used, with the minimum viscosity achieved at different temperatures for different polymers.

For one specific embodiment of the disclosed invention for coating copper wire with coating material comprising a mix of polyvinylformal, bisphenol epoxy, curing agents:

- In TZ1, the temperature of most of the coating material would typically be heated to temperature in the range of 40 to 80° C.
- In TZ2, the temperature of most of the coating material would typically be heated to temperature in the range of 80 to 120° C.
- In TZ3, the temperature of most of the coating material would typically be heated to temperature in the range of 120 to 220° C.

In a second embodiment of the disclosed invention for coating steel wire with a coating material comprising a mixture of 70% polyester, 30% epoxy:

- In TZ1, the temperature of most of the coating material would typically be heated to temperature of 50° C.
- In TZ2, the temperature of most of the coating material would typically be heated to temperature of 70° C.
- In TZ3, the temperature of most of the coating material would typically be heated to temperature of 80° C.

The pressure within the coating chamber 103 during a coating operation is preferably in the range of 5 MPa to 100 MPa.

The temperature of the oven 401 that heats the wire 105 to the temperature at which the thermosetting material sets is typically in the range 250 to 350 or 400° C. The oven temperature depends upon the speed of the wire, as to reach the thermosetting temperature faster moving wire will require to be heated quicker, due to less time in the oven. Preferably, the heating is at atmospheric pressure.

The coating process according to embodiments is highly suited to the industrial production of coated wire 105. Embodiments allow a large quantity of coated wire 105 to be quickly produced in an inexpensive manner that avoids the problems of known solvent based techniques for coating wire 105. Embodiments also require lower temperatures than solvent based techniques and energy efficiency is also improved.

Advantageously, embodiments are able to apply a thin coating to a wire 105 with good accuracy and uniformity of the coating thickness. The thickness of a wire 105 is controllable since a coated wire 105 can be passed through the coating system if a thicker coating is required. The use of thermosetting materials is possible due to the accurate temperature control throughout the apparatus preventing the setting of the material within the apparatus. Thermosetting materials are a higher quality coating than thermoplastics and perform better in high temperature applications.

Another advantage is that the system according to embodiments is highly adaptable and supports the use of a wide range of temperatures, pressures, wire feed speeds and coating material thicknesses. Embodiments are therefore suitable for applying a wide range of coating materials to a wide range of wire types.

Figure 6:
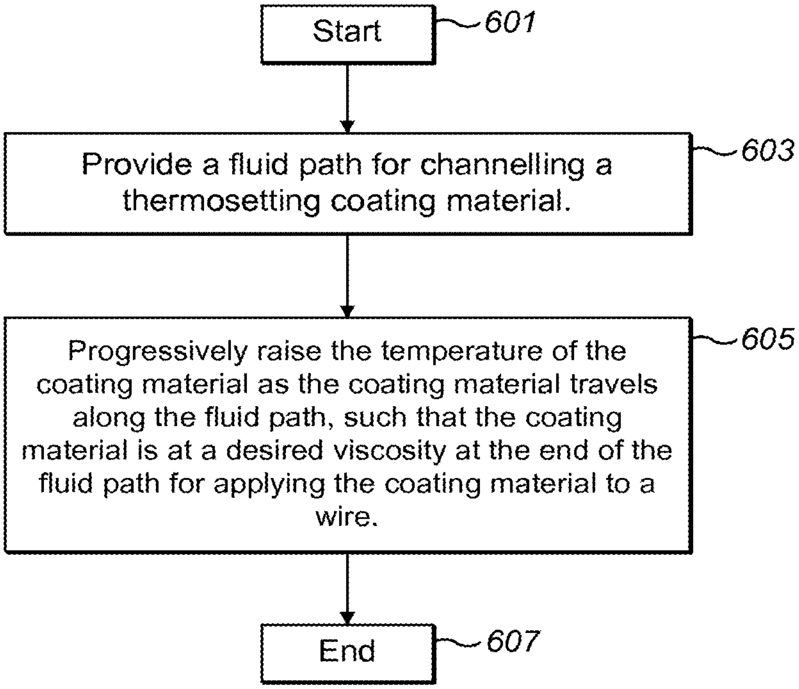
FIG. 6 shows a flowchart of a method of applying a coating material to a wire according to an embodiment of the invention.

FIG. 6 is a flowchart of a method of applying a coating material to a wire according to an embodiment.

In step 601, the process begins.

In step 603, a fluid path is provided for channelling a thermosetting coating material.

In step 605, the temperature of the coating material is progressively raised as the coating material travels along the fluid path, such that the coating material is at a desired viscosity at the end of the fluid path for applying the coating material to a wire.

In step 607, the process ends.

A further embodiment of a method of applying a coating material to a wire comprises; a coating material, that is a thermosetting material, is supplied to the injection channel of a coating apparatus. The coating material in the injection channel is heated to a first temperature such that the coating material flows into the coating chamber of the coating apparatus. The coating material in the coating chamber is heated to a second temperature, higher than the first temperature, such that the coating material has an appropriate viscosity for being applied to a wire, wherein the second temperature is lower that the temperature at which the thermosetting material sets. Wire is fed through the coating chamber of the coating apparatus so as to apply the coating material to the wire.

Embodiments of the invention also include numerous modifications and variations to the above-described embodiments.

In the above-described embodiments, it is necessary for the injection channel 107 to either hold enough coating material for coating all of the wire 105 during a wire coating operation, or for a wire coating operation to be stopped when the coating material in the injection channel 107 has been used up, the piston 106 withdrawn so that more coating material can be fed into the apparatus, the coating material to be heated and pressurised again and then the coating operation restarted. In an alternative embodiment of the invention, the coating apparatus 100 comprises two injection channels and pistons in parallel with each other, with both of the injection channels arranged to feed coating material into the same coating chamber 103. A first injection channel could be used during a wire coating operation. When the coating material in the first injection channel had all been used, the coating operation continues using a second injection channel. The first injection channel could be refilled whilst the second injection channel was being used. Advantageously, a coating operation can be run continuously without being stopped when the coating material in one of the injection channels runs out.

In the above-described embodiments, the coating apparatus 100 is described as having three temperature zones. This is a particularly preferable number of temperature zones for effective operation. However, embodiments also include coating apparatuses with two temperature zones or more than three temperature zones.

The feeding of the coating material into the injection channel 107 can be performed either manually or by an automatic feeding device.

In the above-described embodiments, a piston 106 is used to pressurise the coating material in the injection channel 107. In an alternative embodiment, an extrusion screw mechanism is used instead of a piston 106. This has the advantage of mixing the coating material in the injection channel 107, and achieving a better uniformity of flow of coating material in the coating chamber 103. The orientation of the screw or piston, or any other pressurising means, can be as shown in the figures, perpendicular to the coating chamber. Alternative orientations are conceivable with the pressurising means co-axial with the wire, or at any perceivable angle, such as but not limited to 30° and 120°. At different orientations the pressure required to keep a constant flow of coating material changes, with a lower pressure required at smaller angles. In the embodiment comprising a piston co-axial to the wire the piston comprises a hole to allow the wire to feed through.

The wire 105 being coated would typically have a circular cross-section. However, embodiments are able to apply a coating to wires of any cross-sectional shape. For example, the wire 105 being coated may have a rectangular cross-section as is preferred for the wiring of an electromagnet. The shape of the nozzle may be chosen such that the outlet port of the coating chamber 103 has a corresponding shape to the cross-section of the wire 105.

The lower cylindrical section 102 of the injection channel 107 may comprise a mixing device for mixing the coating material passed there through. This is preferable if the coating material comprises a mixture of substances. Such mixing devices are well known in the art.

Preferably the coating system comprises a device for automatically measuring the thickness of coated wire 105 that is output from the cooling chamber 402. The device would then automatically determine if one or more further passes through the coating system were required in order to achieve a desired wire 105 thickness.

Preferably the coating system also comprises a device for automatically measuring the thickness of wire 105, that may already have a coating, prior to input to the coating apparatus 100. The thickness of each applied layer to a wire 105 by the coating apparatus 100 could then be determined.

Preferably the coating system also comprises a device for automatically determining the uniformity of the thickness of wire 105 that is output from the cooling chamber 402. The performance of the coating system can then be monitored and any erroneous operation quickly detected.

The piston 106 may have a hydraulic drive mechanism. Preferably the drive mechanism comprises hydraulic dampers that decrease oscillations in the pressure induced by the continuous impulses of the hydraulic pump rotation. The driving force is therefore maintained substantially at a desired level and the pressure within the coating apparatus 100 accurately held at a desired level.

In the above-described embodiments, the injection channel 107 comprises cylindrical sections with circular cross sections. Although this is a preferable configuration, embodiments also include the injection channel 107 having alternative cross sectional shapes, such as hexagonal or square.

The coating apparatus 100 may also include one or more exit valves in the coating chamber 103 and/or injection channel 107 to aid the removal of the coating material after a coating operation.

According to one aspect, in order to minimize the negative effect of the pressure generated in the coating chamber by the injection of coating material, the pressurizer is configured to adjust the pressure exerted on the coating material contained in the injection channel as a function of the quantity of the coating material contained in the coating chamber. For example, the apparatus may comprise means for directly or indirectly measuring the quantity of coating material contained in the coating chamber by means of, for example, a weight sensor configured to weight the load of the coating chamber, or a touch sensor located in a predetermined location of the coating chamber and configured to detect the presence of coating material in said predetermined location; consequently, the pressurizer may be configured to pressurize the coating material contained in the injection channel only when the quantity of coating material contained in the coating chamber is close or lower than a predetermined threshold. For example, the pressurizer can be configured to pressurize the coating material contained in the injection channel if the coating chamber is not entirely filled with coating material (i.e., the quantity of coating material is lower than a predetermined threshold); in contrast, the pressurizer may be configured to remove any pressure from the coating material contained in the injection channel if the coating chamber is entirely filled with coating material (i.e., the quantity of coating material is higher than a predetermined threshold). In general, the pressure exerted by the pressurizer on the coating material in the injection channel can be adjusted as a function of the quantity of the coating material contained in the coating chamber.

As a result, the pressurizer is capable of replenishing the coating chamber at a rate (also referred to as injection rate or input rate) equal to the rate (also referred to as coating rate or output rate) at which the coating material exits the coating chamber. At the same time, as the pressure is only applied when the coating chamber needs to be replenished with coating material (i.e., no pressure is applied when the coating chamber is entirely filled with coating material), the pressure inside the coating chamber is not impacted by the replenishing operation of the supplying means.

The flowcharts and description thereof herein should not be understood to prescribe a fixed order of performing the method steps described therein. Rather, the method steps may be performed in any order that is practicable. Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

The invention claimed is:

1. A method of applying a polymer coating material to a wire using a coating apparatus, the method comprising:

receiving coating material input to the coating apparatus at a first end of an elongate injection channel of the coating apparatus and supplying the received coating material to a coating chamber that is arranged at a second end of the injection channel, the coating chamber comprising a cylindrical central section for receiving coating material from the injection channel and a nozzle that tapers conically from a maximum diameter at a junction with the cylindrical central section to a minimum diameter at an outlet port;

heating the coating material in the injection channel to a first temperature;

pressurizing the coating material in the injection channel such that the coating material flows into the coating chamber;

heating the coating material to a second temperature, higher than the first temperature, such that the coating material has an appropriate viscosity for being applied to the wire; and feeding wire through the coating chamber of the coating apparatus so as to apply the coating material to the wire in the coating chamber through the movement of the wire through the coating chamber;

adjusting the pressure exerted on the coating material in the injection channel as a function of the quantity of the coating material contained in the coating chamber; and removing pressure from the coating material contained in the injection channel if the quantity of coating material contained in the coating chamber is higher than a predetermined threshold.

2. The method according to claim 1, wherein the wire fed through the coating chamber is in direct contact with the coating material in the cylindrical section of the coating chamber and in the nozzle of the coating chamber.

3. The method according to claim 1, wherein the wire is centered by hydrodynamic forces generated by the nozzle.

4. The method according to claim 1, wherein the coating material is a plastic material.

5. The method according to claim 1, wherein the coating material is a thermosetting polymer, the coating material comprising one or more of polyester, epoxy-polyester mixture, polyesterimide, polyesterimide and amideimide mixture, polyethylene, polyethylenimine, polyurethane, polyamide, epoxy, polyamide-imide, polyvinyl formal and thermosetting additives.

6. The method according to claim 5, wherein the second temperature is lower than the temperature at which the thermosetting polymer sets.

7. The method according to claim 1, wherein the coating material adhering upon the wire is progressively thickened as the wire progresses along the coating chamber until reaching a maximum thickness in a proximity of the outlet port.

8. The method according to claim 7, wherein the progressive thickening is due to additional resistance from hydrodynamic forces generated within the coating chamber.

9. The method according to claim 1, wherein the injection channel is configured to replenish the coating chamber at a first rate equal to a second rate at which the coating material exits the coating chamber adhered to the wire.

10. The method according to claim 9, wherein replenishing the coating chamber does not increase the pressure within the coating chamber.

11. The method according to claim 1, wherein a combination of speed of the wire passing through the coating chamber and density, temperature and viscosity of the coating material in the coating chamber is configured to generate hydrodynamic forces within the coating chamber to adhere the coating material to the wire.

12. The method according to claim 11, further comprising a control system, wherein the control system is configured to control the temperature of the coating material and the speed of the wire through the coating chamber such that the hydrodynamic forces are generated within the coating chamber to adhere the coating material to the wire.

13. The method according to claim 1, wherein the coating material in the coating chamber is conveyed out of the coating chamber exclusively by the motion of the wire moving through the coating chamber.

* * * * *